Dec. 10, 1963   A. D. STRUBLE, JR   3,113,748
BALLOON
Filed April 6, 1962   2 Sheets-Sheet 1
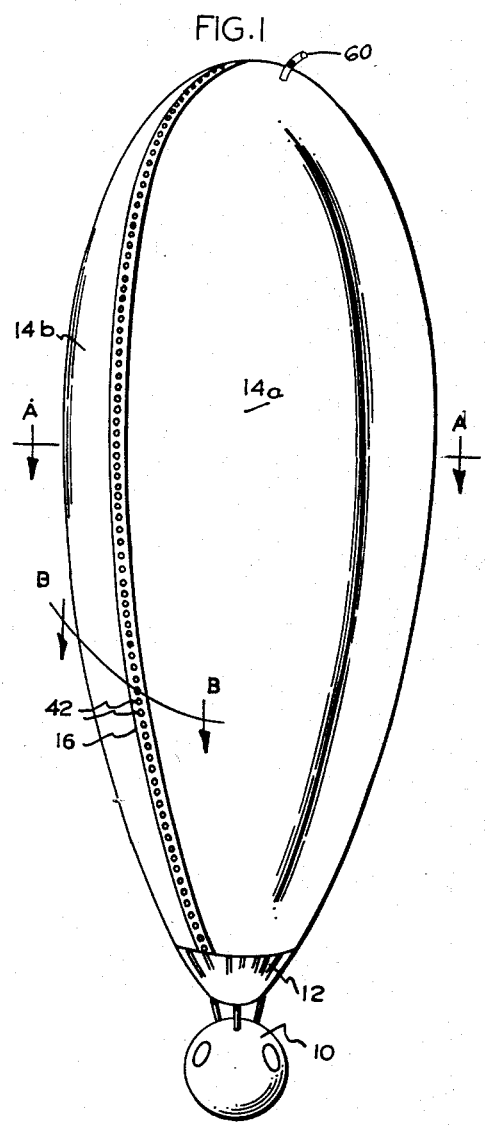
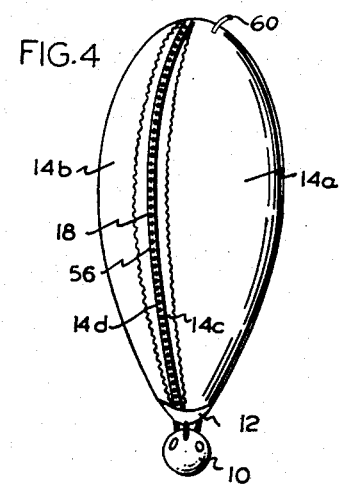
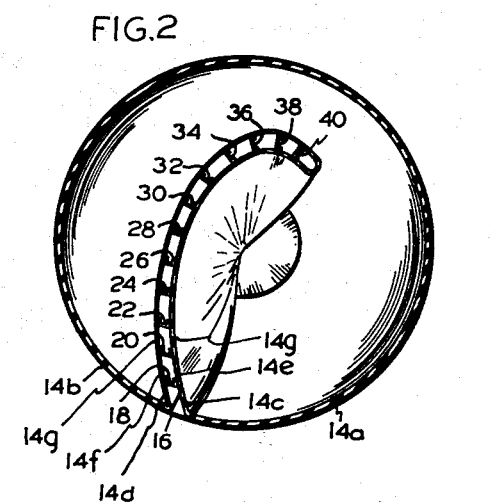
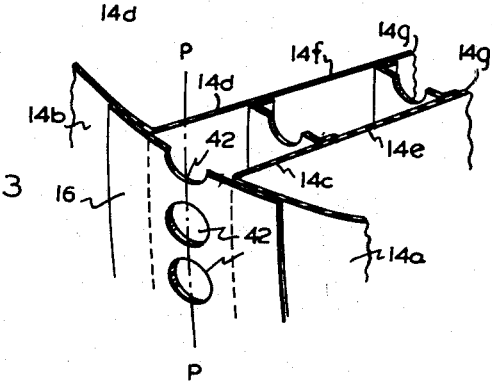

Dec. 10, 1963 A. D. STRUBLE, JR 3,113,748
BALLOON
Filed April 6, 1962 2 Sheets-Sheet 2
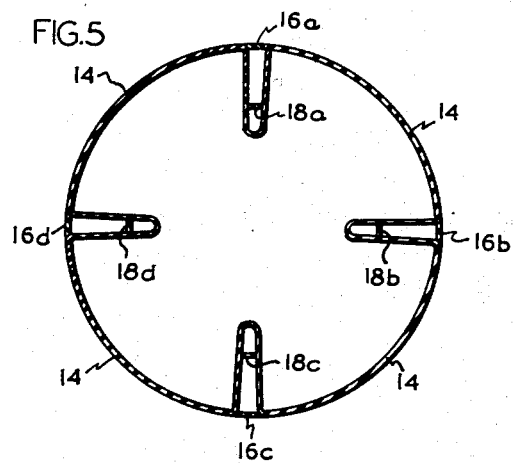
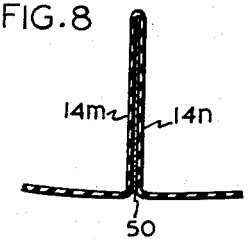
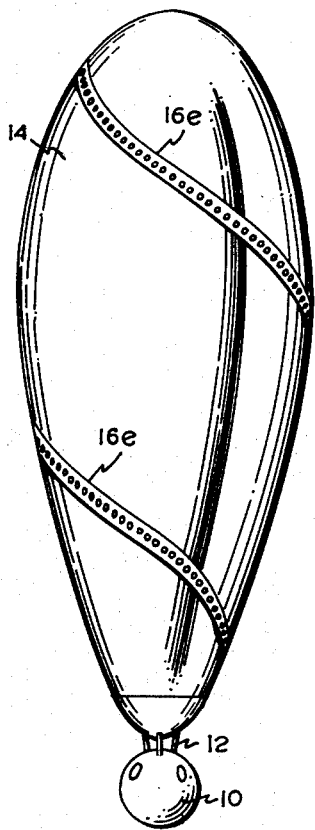
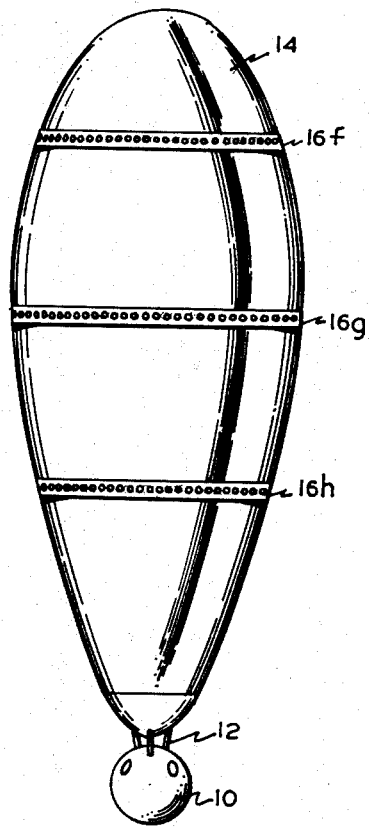

ered Dec. 10, 1963

3,113,748
BALLOON
Arthur D. Struble, Jr., 2101 Rosita Place,
Palos Verdes, Calif.
Filed Apr. 6, 1962, Ser. No. 185,585
10 Claims. (Cl. 244—31)

This invention generally relates to a novel balloon structure. More particularly this invention relates to a novel type of balloon structure which permits the size and shape of a balloon to be changed in a predetermined sequential fashion as the balloon ascends into the stratosphere.

Balloons which are capable of carrying substantial loads and which are capable of ascending into the stratosphere must be rather large. The balloon envelope before inflation is very bulky and difficult to handle. In nearly every stratosphere balloon, the balloon envelope is only partially inflated at ground level because room must be left for the lifting gas to expand greatly as the balloon ascends to the very low pressure of the stratosphere. The present procedure for launching such balloons is to inflate them with a relatively small bubble of gas which is inserted at the lower end of the balloon and then the gas is passed through the folds of the balloon material toward the upper end of the balloon. The balloon at the beginning of inflation is usually lying on the ground and the gas must pass from the lower end through a considerable length of balloon to get to the upper end of the balloon.

The launching of such balloons is a difficult, risky operation, particularly when the launch area is windy. Current weather balloons have a climb speed in the neighborhood of 650–900 feet per minute. This speed is not fast enough to avoid strain and damage to the balloon when the ascending balloon encounters severe cross winds and other atmospheric turbulence. The "excess" portion of the balloon which is not inflated at launch frequently is whipped by the wind and a sail-like effect often results in the balloon being blown far off course before it has risen very far. In order to protect the balloon against these detrimental effects, many balloons have been made from fabric which is of greater thickness than is really necessary if these dangerous conditions did not exist. As a result their altitude is limited to 100,000–120,000 feet.

It is therefore a primary object of this invention to provide a balloon which largely overcomes many of the aforementioned problems. In particular, it is an object of this invention to produce a balloon which will rise at a rate of about 1800 feet per minute and reach an altitude of about 150,000 feet. Another object of this invention is to provide a balloon which is capable of making changes in shape as it ascends, and in particular to retain a streamline shape from launch to altitude so that maximum climb speed can be maintained during the balloon ascent and further to provide a shape which is generally spheroid to allow the balloon to reach a higher maximum ceiling.

A further object of the invention is to provide a balloon structure which will not expose great uninflated segments of the balloon envelope to turbulent atmospheric conditions during the ascension.

These and other objects and advantages will become more apparent after reading the following specific description in conjunction with the drawings, wherein:

FIGURE 1 is a perspective view of a novel balloon in accordance with this invention;
FIGURE 2 is a view along A—A of FIGURE 1;
FIGURE 3 is a view along B—B of FIGURE 1;
FIGURE 4 is a perspective view designed to show the change in appearance after a seam has ruptured;
FIGURE 5 is a cross sectional view of a balloon illustrating still another embodiment of the invention;
FIGURE 6 is a perspective view of another embodiment of the invention;
FIGURE 7 is a perspective view of still another embodiment of the invention;
FIGURE 8 is a fragmentary cross sectional view illustrating the use of an adhesive seam in place of a material seam;
FIGURE 9 is designed to show the change of balloon shape with altitude when utilizing this invention.

The present invention broadly involves a high altitude balloon comprising:

(a) A balloon envelope,
(b) A gas inlet for said balloon envelope,
(c) A portion of said balloon envelope being folded inwardly and held inwardly by at least one rupturable seam,
(d) Said seam being sufficiently strong that it will not rupture under the outward pressure exerted by an amount of gas just sufficient to cause the balloon to ascend from its launch area, and
(e) Said seam being sufficiently weak so that it will rupture when the outward pressure within the balloon exceeds by a predetermined amount the outward pressure which is just sufficient to cause the balloon to ascend from its launch area.

Referring now to FIGURE 1, there is shown a perspective view of the novel balloon in accordance with this invention at the time of launch. An inlet 60 for gas is shown in the top of the balloon. It will be seen that a payload section 10 (containing instruments, etc.) is suspended beneath the balloon itself by an intermediate connecting section 12 (which is preferably stronger than the remainder of the balloon and non-expandable). As seen in FIGURE 1 the balloon at launch is essentially oblong and streamline in shape somewhat like a dirigible standing on end. The volume of the balloon is preferably just sufficient to contain the required lifting gas at sea level plus the volume represented by a change in slenderness ratio from 3.5 to 7.

The balloon structure shown in FIGURE 1 actually has a portion of the balloon envelope folded inwardly and held inwardly by at least one rupturable seam. The folded-in portion of the envelope is perhaps most clearly viewed in FIGURES 2 and 3. FIGURE 2, for instance, is a cross sectional view through A—A of FIGURE 1 and shows that a substantial portion of the envelope has been folded inwardly.

It will also be seen that the inwardly folded portion of the balloon envelope is held inwardly by at least one tape or seam section extending from the lower to the upper part of the envelope. The outermost rupturable seam section 16 connects outer portions 14a and 14b of the balloon envelope. The seam section 16 is seen to consist of a relatively narrow elongated panel of material extending from the bottom to the top of the balloon. The rupturable seam is designed to rupture along the line P—P (see FIGURE 3). Rupturing of the seam along this line is facilitated by providing a plurality of holes 42 in the rupturable seam section 16.

Although the rupturable seam section 16 has been shown to extend in an essentially vertical direction, it would of course involve no invention to have a seam section 16e wind spirally around the balloon in an upward direction as in FIGURE 6. Spin stabilization of the ascent trajectory can be achieved by properly aligning the rupturable seams spirally down the length of the balloon along with special shaping of the balloon nose. It would also involve no invention to have the seam extend in an essentially horizontal position or several horizontal positions (16f, 16g, 16h in FIGURE 7). There can also be a plurality of vertical inwardly folded portions as is shown by the cross sectional view of a balloon 14 in FIGURE 5 (wherein the rupturable seams are shown as 16a–16d and 18a–18d). Alternatively there could be a combination of horizontal and vertical seams.

Those skilled in the art will readily recognize that there are a number of obvious equivalents to the type of rupturable seam specifically shown in FIGURE 3. The rupturable seam can be made from the same material as the balloon envelope or from different material. One might even simply use a tacky adhesive which would gradually "give" with a change in altitude or with a change in the pull by the two balloon sections it was holding together.

FIGURE 8 shows an inwardly folded section 14m and 14n held together by a tacky adhesive 50 of predetermined strength. Another replacement for the seam shown might be the "Velcro" type of interlocking fabric shown in U.S. Patent 2,717,437.

As noted previously, the balloon preferably has the approximate configuration shown in FIGURE 1 at the time of launch. In other words, when just enough gas has been introduced into the balloon so that it will have enough buoyancy to rise from the launch area, the outward pressure of the gas against portions 14a and 14b of the balloon envelope is insufficient to cause the seam section 16 to rupture along the line P—P. However, as the balloon rises upwardly the density of the atmosphere becomes less which means that the gas within the balloon will attempt to expand outwardly. This outward expansion force of the gas within the balloon is of course transmitted directly to the walls of the balloon and in particular to portions 14a and 14b of the balloon envelope. When this outward pressure becomes sufficiently great the seam section 16 is designed to rupture along the line P—P. When seam section 16 ruptures in this fashion what happens is that a portion of the balloon envelope which was previously folded inwardly will be expanded outwardly so that it for the first time forms a part of the outer balloon envelope. In FIGURES 2 and 3 it will be seen that that when seam section 16 is ruptured, the sections 14c and 14d of the inwardly folded balloon envelope will expand outwardly and form an added part to the balloon envelope. When this occurs, the pressure within the balloon is reduced due to the greater vloume of the balloon and seam 18 then becomes the outer rupturable seam. However, as the balloon ascends another few hundred or few thousand feet the outward pressure of the gas within the balloon will again become so great that seam section 18 will rupture in the same fashion as did seam section 16. When this occurs then portions 14e and 14f of the inwardly folded balloon envelope become a part of the outer envelope of the balloon. This sequential process of outward pressuring, seam rupture and increasing balloon volume can be repeated any desired number of times.

FIGURE 2 shows that a balloon structure can have a plurality of such seam sections (16–40) so that as the balloon ascends into the atmosphere and stratosphere there will be a continuous or sequential rupturing of each of the seams and a sequential enlargement of the balloon configuration. FIGURE 4 is slightly exaggerated but is designed to show the differing shape of the balloon (toward a more round shape) as a seam ruptures at a higher altitude or toward keeping a streamline shape.

FIGURE 9 is designed to illustrate how a balloon made in accordance with this invention would change in shape with increased altitude. It will be seen that the shape changes from being somewhat cigar-shaped at ground level and much more like a spheroid in the final stages of the higher altitudes. Climb rate would suffer but higher maximum altitudes could be reached since the balloon material displayed as a spheroid would have a larger displacement volume.

The total size and weight of the balloon is of course variable, since this invention is applicable to very small weather balloons weighing only a few pounds as well as the very large balloons designed to carry both men and instruments into the stratosphere.

When the balloon reaches the desired maximum height, devices which are well known to the art may be employed to prevent further ascension, as for example, opening up the bottom of the balloon. Other known balloon techniques and devices can also be used in connection with the invention.

I prefer to use the balloon envelope structure set forth in my copending application Serial No. 128,799 in connection with the present invention.

The balloon of this invention has a number of advantages. First of all, because of its streamline shape at most altitudes it is capable of climbing at a rate in the order of 1800 feet per minute. Secondly, because of its shape and protected uninflated portions it does not have to be made from as heavy material and is therefore capable of reaching greater altitudes, for instance in the order of 150,000 feet. Thirdly, since the balloon of this invention is streamlined in shape at most altitudes and since it protects the uninflated portions of the balloon during a good portion of the flight (and in some cases during the entire flight), the balloon of this invention can be launched under much more unfavorable weather conditions than can the ordinary stratospheric balloon. Furthermore, the streamlined shape of the present balloon during a large portion of the ascension considerably reduces the atmospheric drag upon the balloon (by as much as a factor of at least 2.5), such reduction of course measurably improving the climb rate potential for a balloon.

In conclusion, while there have been illustrated and described several preferred embodiments of my invention, it is to be understood that since the various details of construction may obviously be varied considerably without really departing from the basic principles and and teachings of this invention, I do not limit myself to the precise constructions herein disclosed and the right is specifically reserved to encompass all changes and modifications coming within the scope of the invention as defined in the appended claims. Having thus described my invention, what I claim as new and desire to secure a United States Letters Patent for is:

What is claimed is:

1. A high altitude balloon comprising:
    (a) a balloon envelope,
    (b) a gas inlet for said balloon envelope,
    (c) at least one portion of said balloon envelope being folded inwardly and held inwardly by at least one rupturable seam,
    (d) said seam being sufficiently strong that it will not rupture under the outward pressure exerted by an amount of gas just sufficient to cause the balloon to ascend from its launch area, and
    (e) said seam being sufficiently weak so that it will rupture when the outward pressure within the balloon exceeds by a predetermined amount the outward pressure which is just sufficient to cause the balloon to ascend from its launch area.

2. A balloon according to claim 1 wherein the portion of the balloon which is folded inwardly is held inwardly by a plurality of spaced apart seams so that sequential rupturing of the seams will occur as the balloon rises in altitude.

3. A balloon according to claim 1 wherein the configuration of the balloon at the time of launch is oblong and streamlined and generally resembles a dirigible standing on end.

4. A balloon according to claim 1 wherein there are a plurality of folds.

5. A balloon according to claim 1 wherein each fold is essentially vertical.

6. A balloon according to claim 1 wherein each fold is essentially horizontal.

7. A balloon according to claim 1 wherein each fold spirals around the balloon.

8. A balloon according to claim 1 wherein each rupturable seam comprises fabric material which will rupture under a predetermined stress.

9. A balloon according to claim 1 wherein each rupturable seam consists of tacky adhesive which will part under a predetermined tension.

10. A balloon according to claim 1 wherein the rupturable seams have about one-third the strength of the balloon envelope.

References Cited in the file of this patent

UNITED STATES PATENTS 2,954,191    Moran _____ Sept. 27, 1960